United States Patent Office 2,813,874
Patented Nov. 19, 1957

2,813,874

AZACYCLOHEXANE COMPOUNDS AND METHODS FOR PREPARING THEM

William F. Bruce, Havertown, and Julius Diamond and Richard De Vere Huber, Philadelphia, Pa., assignors to American Home Products Corporation, New York, N. Y., a corporation of Delaware No Drawing. Application September 3, 1954,
Serial No. 454,196

9 Claims. (Cl. 260—294.3)

This invention relates to azacyclohexane compounds and more particularly to bis-quaternary salts comprising said heterocyclic rings.

The compounds of the invention fall within the following general formula:

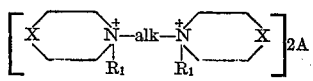

wherein

represents an azacyclohexane ring $R_1$ represents a lower alkyl, preferably methyl, "alk" indicates a divalent alkylene radical of 4 to 12 carbon atoms and A stands for a pharmacologically non-toxic anion. Suitable salts of the free bases may comprise the bromides, iodides, nitrates, sulphates or salts of the lower aliphatic carboxylic acids. Actually any acid may be used which is known to be pharmacologically safe.

With regard to the azacyclohexane ring represented above, it may be more specifically illustrated by the structure

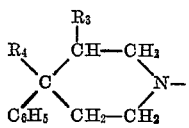

wherein $R_3$ stands for hydrogen or a lower alkyl, while $R_4$ represents either hydrogen, —COO·lower alkyl, or —O—CO·lower alkyl.

The compounds of the invention are pharmacologically useful in the veterinary or human field in that they have been found to possess curare-like, muscle-relaxing action among other pharmacological actions. Compounds showing the strongest curare-like action are those where $R_3$ stands for hydrogen with $R_4$ representing an ester of the —COO·lower alkyl type, and with the alkylene chain having 7 to 8 carbon atoms.

The compounds may be prepared by heating the azacyclohexane with an akylene dihalide preferably using a molar ratio of at least 2:1 azacycloalkane to halide.

It has been found that substantial yields may be achieved if the reaction takes place in a solvent and if the solvent medium is highly polar, having a high dielectric constant or dipole moment under standard conditions (20° C.) of about 2.5 Debye units or greater. The dielectric constant should be about 10 (epsilon) or greater and preferably from about 15 to 40 when measured under standard conditions. Additionally the highly polar solvent should have a boiling point above about 70° C. since the reaction goes best and with the greatest yield within the range of about 70° to 100° C. although the reaction will take place within the range of about 25° to 120° C. Examples of preferred solvents are the nitro and nitrile compounds such as nitrobenzene, nitromethane, nitroethane, 1-nitropropane, acetonitrile and benzonitrile.

If the precipitate that forms from the aforesaid reaction is large, the reaction mixture is chilled with ice-water and then treated with a large volume of relatively low boiling ketone, such as acetone or methyl-ethylketone. If little or no precipitate forms, the reaction mixture is treated with a relatively non-polar solvent such as diethylether, heptane or benzene. Surprisingly, an excellent granular product is obtained by adding the reaction mixture gradually to the non-polar solvent, rather than using the reverse procedure.

The desired product obtained as a precipitate is separated from the reaction mixture, washed with non-polar solvent and dried. If further precipitation is sought, the product may be recrystallized from a mixture of a low boiling alcohol of 1 to 5 carbon atoms and low boiling ketone having 3 to 6 carbon atoms, ether, or hydrocarbon solvent being used additionally if the crystallization takes place too slowly.

The following examples disclose the invention in specific form. It should be made clear that the following examples are merely for illustrative purposes and are not to be considered limitative of the invention.

EXAMPLE 1

*1,4-bis-(1-methyl-4-phenyl-azacyclohexane-onium)-tetramethylene dibromide*

N-methyl-4-phenyl-azacyclohexane, 3.5 g. (0.020 mole), 1,4-dibromobutane, 1.9 g. (0.0090 mole), and nitrobenzene, 15 ml., were heated at 100 C. for 21 hours. After cooling to room temperature, the mass was stirred with acetone, 200 ml., and filtered. The solid was dissolved in a mixture of acetone and methanol (minimum) and reprecipitated by the addition of a large volume of ether. After filtering and air-drying, the product was obtained, melting at 212–15° C.

Analysis.—$C_{28}H_{42}N_2Br_2$:

| | Nitrogen | Bromine |
|---|---|---|
| | Percent | Percent |
| Calcd | 4.95 | 28.3 |
| Found | 4.68 | 28.3 |

EXAMPLE 2

*1,5-bis-(1-methyl-4-phenyl-azacyclohexane-onium)-pentamethylene dibromide*

N-methyl-4-phenyl-azacyclohexane, 3.5 g. (0.020 mole), 1,5-dibromopentane, 2.1 g. (0.0090 mole), and nitrobenzene, 15 ml., were mixed and heated at 100° C. for 21 hours. After cooling to room temperature, the mass was stirred with acetone, 200 ml., and filtered. The solid was dissolved in acetone and methanol (minimum) and reprecipitated by gradually adding a large volume of ether. After filtering and air-drying, the product was obtained, melting at 232–35° C.

Analysis.—$C_{29}H_{44}N_2Br_2$:

| | Nitrogen | Bromine |
|---|---|---|
| | Percent | Percent |
| Calcd | 4.83 | 27.6 |
| Found | 4.61 | 27.5 |

EXAMPLE 3

*1,4-bis-(4-carbethoxy-1-methyl-4-phenyl-azacyclohexane-onium)-tetramethylene dibromide*

4 - carbethoxy - 1 - methyl - 4 - phenyl - piperidine, 2.5 g. (0.010 mole), 1,4-dibromobutane, 0.86 g. (0.0040 mole) and nitrobenzene, 5 ml., were mixed and heated at 100° C. for 20 hours. The cooled, crystalline mass was stirred well with acetone, filtered and the ppt. stored under dry ether for 3 days. This gave the product, melting at 216–218° C.

*Analysis.*—$C_{34}H_{50}N_2O_4Br_2$: Nitrogen—Calcd., 3.94%. Found, 3.68%.

EXAMPLE 4

*1,5-bis-(4-carbethoxy-N-methyl-4-phenyl-azacyclohexane-onium)-pentamethylene dibromide*

The compound 4-carbethoxy-1-methyl-4-phenyl-piperidine, 2.5 g. (0.010 mole), 1,5-dibromopentane, 0.92 g. (0.0040 mole), and nitrobenzene, 5 ml. were mixed and heated at 100° C. for 20 hours. The resulting cooled solution was treated with a large volume of ether, and the precipitate that resulted was reprecipitated by dissolving in acetone and adding a large volume of ether. After washing well with ether for 3 days, the desired product was obtained and began to melt at 90° C.

*Analysis.*—$C_{35}H_{52}N_2O_4Br_2$:

|  | Nitrogen | Bromine |
|---|---|---|
|  | Percent | Percent |
| Calcd | 3.86 | 22.1 |
| Found | 4.08 | 22.0 |

EXAMPLE 5

*1,6-bis-(4-carbethoxy-1-methyl-4-phenyl-azacyclohexane-onium)-hexamethylene dibromide*

4-carbethoxy-1-methyl-4-phenyl-azacyclohexane, 2.6 g. (0.0105 mole), 1,6-dibromohexane, 1.1 g. (0.0045 mole), and nitrobenzene, 5.0 ml., were mixed and heated at 100° C. for 2 hours. After cooling down to room temperature, the crystalline mass was treated with acetone, 50 ml., cooled in ice-bath, and filtered. The solid was washed with acetone and ether, and finally stored overnight under ether. This gave the product, melting at 225–227° C. with decomposition.

*Analysis.*—$C_{36}H_{54}N_2O_4Br_2$:

|  | Nitrogen | Bromine |
|---|---|---|
|  | Percent | Percent |
| Calcd | 3.79 | 21.7 |
| Found | 3.79 | 21.1 |

EXAMPLE 6

*1,7-bis-(4-carbethoxy-1-methyl-4-phenyl-azacyclohexane-onium)-heptamethylene dibromide*

4-carbethoxy-N-methyl-4-phenyl-azacyclohexane, 2.5 g. (0.010 mole), 1,7-dibromoheptane, 1.3 g. (0.0050 mole), and nitrobenzene, 4.0 ml., were mixed and heated at 100° C. for 18 hours. After cooling in ice, the solution was diluted with 30 ml. of acetone and added dropwise to 170 ml. of stirred anhydrous ether. The precipitate was washed well with dry ether by continuous stirring and then stored under ether for 5 days. This gave the product, which began to melt at 90° C.

*Analysis.*—$C_{37}H_{56}N_2O_4Br_2$:

|  | Nitrogen | Bromine |
|---|---|---|
|  | Percent | Percent |
| Calcd | 3.72 | 21.3 |
| Found | 3.80 | 21.1 |

EXAMPLE 7

*1,8-bis-(4-carbethoxy-1-methyl-4-phenyl-azacyclohexane-onium)-octamethylene dibromide*

4-carbethoxy-1-methyl-4-phenyl-piperidine, 2.5 g. (0.010 mole), 1,8-dibromooctane, 1.3 g. (0.0050 mole), and nitrobenzene, 4.0 ml., were mixed and heated at 100° C. for 18 hours. After cooling the solution in ice, it was diluted with 30 ml. of acetone, and after 24 hours, the crystallization was enhanced by stirring and treating dropwise with 150 ml. of dry ether. The solid was washed and dried well under ether. This gave the product, which melted at 200–204° C.

*Analysis.*—$C_{38}H_{58}N_2O_4Br_2$: Nitrogen—Calcd., 3.65%. Found, 3.67%.

EXAMPLE 8

*1,10-bis-(4-carbethoxy-1-methyl-4-phenyl-azacyclohexane-onium)-decamethylene diiodide*

4-carbethoxy-1-methyl-4-phenyl-piperidine, 2.6 g. (0.0105 mole), 1,10-diiododecane, 2.0 g. (0.0050 mole), and nitrobenzene, 5 ml., were heated at 100° C. for 15 hours. The solution that resulted was cooled to room temperature, diluted with acetone, heated with charcoal, and filtered. On further dilution with acetone and cooling to 5° C. the product crystallized. More crystals were obtained by cooling with a Dry-Ice and acetone bath and adding dry ether gradually. The solid was filtered, washed with 1:1 acetone:ether and finally washed and dried under ether. This gave the product, melting at 198–201° C.

*Analysis.*—$C_{40}H_{62}N_2O_4I_2$:

|  | Nitrogen | Iodine |
|---|---|---|
|  | Percent | Percent |
| Calcd | 3.15 | 28.5 |
| Found | 3.75 | 28.2 |

EXAMPLE 9

*1,6-bis-(1,3-dimethyl-4-phenyl-4-propionoxy-azacyclohex-ane-onium)-hexamethylene dibromide*

1,3-dimethyl-4-phenyl-4-propionoxy-piperidine, 1.6 g. (0.0065 mole), hexamethylene dibromide, 0.73 g. (0.0030 mole), and acetonitrile, 5 ml., were mixed together and refluxed for 24 hours. After cooling down to room temperature, the mixture was diluted with 10 ml. of acetone, filtered and added dropwise with good stirring to 200 ml. of anhydrous ether. The mixture was cooled down with Dry-Ice, the supernatant solution was decanted, and the white, granular precipitate was washed with dry ether by trituration. After filtering and drying, the product started to melt at 115° C.

*Analysis.*—$C_{38}H_{58}Br_2N_2O_4$:

|  | Nitrogen | Bromine |
|---|---|---|
|  | Percent | Percent |
| Calcd | 3.66 | 20.9 |
| Found | 3.68 | 21.2 |

We claim:

1. The process comprising reacting an azacyclohexane with an alkylene dihalide having from 4 to 12 carbon atoms in the presence of a highly polar organic solvent at a temperature in the range of about 25° to about 120° C.

2. The process comprising reacting an azacyclohexane with an alkylene dihalide having from 4 to 12 carbon atoms at a temperature in the range of about 70° to about 100° C. in the presence of a highly polar solvent having a boiling point above about 70° C. and then commingling said reaction mixture with a non-polar solvent.

3. The process of claim 2; wherein the reaction mixture is gradually added to said non-polar solvent.

4. A quaternary ammonium salt which contains the cation

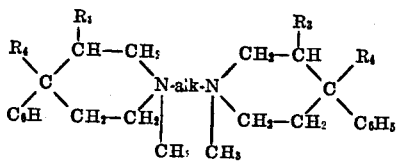

wherein R₃ represents a member of the group consisting of hydrogen and methyl, R₄ standing for a member of the group consisting of hydrogen, —COO·lower alkyl and —O—CO·lower alkyl, while "alk" stands for an alkylene radical of 4 to 10 carbon atoms.

5. A quaternary ammonium salt containing the cation

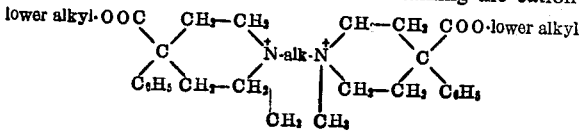

wherein "alk" stands for an alkylene radical of 4 to 10 carbon atoms.

6. The compound, 1,4 - bis-(4-carbethoxy-1-methyl-4-phenyl-azacyclohexane-onium) - tetra - methylene dibromide.

7. The compound, 1,5-bis-(4-carbethoxy-1-methyl-4-phenyl - azacyclohexane - onium) - pentamethylene dibromide.

8. The compound, 1,6-bis-(4-carbethoxy-1-methyl-4-phenyl - azacyclohexane - onium) - hexamethylene dibromide.

9. The compound, 1,8-bis-(4-carbethoxy-1-methyl-4-phenyl - azacyclohexane-onium) - octa - methylene dibromide.

References Cited in the file of this patent

Collier: Nature, volume 164, pp. 491–492, 1949.
Libman et al.: Journal of the Chemical Society of London for 1952, pp. 2305–2307.
Taylor: Journal of the Chemical Society of London for 1951, pp. 1150–1157.